United States Patent
Lv et al.

(10) Patent No.: US 11,567,826 B2
(45) Date of Patent: *Jan. 31, 2023

(54) DETECT AND TRIAGE DATA INTEGRITY ISSUE FOR VIRTUAL MACHINE

(71) Applicant: EMC IP Holding Company LLC, Hopkinton, MA (US)

(72) Inventors: Man Lv, Beijing (CN); Yong Zou, Beijing (CN); Assaf Natanzon, Tel Aviv (IL); Bing Liu, Tianjin (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/405,568

(22) Filed: Aug. 18, 2021

(65) Prior Publication Data

US 2021/0382783 A1    Dec. 9, 2021

Related U.S. Application Data

(60) Continuation of application No. 16/906,482, filed on Jun. 19, 2020, now Pat. No. 11,099,930, which is a division of application No. 15/634,500, filed on Jun. 27, 2017, now Pat. No. 10,776,197.

(51) Int. Cl.
    *G06F 11/00*     (2006.01)
    *G06F 11/10*     (2006.01)
    *G06F 3/06*      (2006.01)

(52) U.S. Cl.
    CPC .......... *G06F 11/1004* (2013.01); *G06F 3/064* (2013.01); *G06F 3/067* (2013.01); *G06F 3/0619* (2013.01); *G06F 3/0664* (2013.01)

(58) Field of Classification Search
    None
    See application file for complete search history.

(56) References Cited

U.S. PATENT DOCUMENTS

| | | | |
|---|---|---|---|
| 6,460,050 B1 * | 10/2002 | Pace | G06Q 10/107 |
| 9,672,374 B2 | 6/2017 | Kabra et al. | |
| 10,262,023 B1 | 4/2019 | Kuang et al. | |
| 10,402,577 B2 * | 9/2019 | Knapp | G06F 21/6218 |
| 2002/0112134 A1 | 8/2002 | Ohran et al. | |
| 2004/0153961 A1 | 8/2004 | Park et al. | |
| 2010/0262797 A1 | 10/2010 | Rosikiewicz et al. | |
| 2011/0145632 A1 | 6/2011 | Waldspurger et al. | |

(Continued)

OTHER PUBLICATIONS

K. Onarlioglu, W. Robertson and E. Kirda, "Overhaul: Input-Driven Access Control for Better Privacy on Traditional Operating Systems," 2016 46th Annual IEEE/IFIP International Conference on Dependable Systems and Networks (DSN), 2016, pp. 443-454, doi: 10.1109/DSN.2016.47. (Year: 2016).

(Continued)

Primary Examiner — Daniel F. McMahon
(74) Attorney, Agent, or Firm — Workman Nydegger

(57) ABSTRACT

One example method includes receiving an IO request that specifies an operation to be performed concerning a data block, determining if a policy exists for a device that made the IO request, when a policy is determined to exist for the device, comparing the IO request to the policy, recording the IO request, and passing the IO request to a disk driver regardless of whether the IO request is determined to violate the policy or not.

12 Claims, 6 Drawing Sheets

(56) References Cited

U.S. PATENT DOCUMENTS

| | | |
|---|---|---|
| 2013/0205106 A1 | 8/2013 | Tati et al. |
| 2015/0277802 A1 | 10/2015 | Oikarinen et al. |
| 2015/0347240 A1 | 12/2015 | Elias et al. |
| 2018/0113638 A1 | 4/2018 | Petersen et al. |
| 2019/0220627 A1 | 7/2019 | Lemasters et al. |
| 2020/0099721 A1 | 3/2020 | Golan et al. |

OTHER PUBLICATIONS

L. N. Bairavasundaram, A. C. Arpaci-Dusseau and R. H. Arpaci-Dusseau, "Dependability Analysis of Virtual Memory Systems," International Conference on Dependable Systems and Networks (DSN'06), Philadelphia, PA, 2006, pp. 355-364, (Year: 2006).

\* cited by examiner

DETECT AND TRIAGE DATA INTEGRITY ISSUE FOR VIRTUAL MACHINE

FIELD OF THE INVENTION

Embodiments of the present invention relate to detecting and triaging problems in a virtual computing environment. More particularly, at least some embodiments of the invention relate to systems, hardware, computer-readable media, and methods directed to detecting and triaging data integrity issues in a virtual computing environment that includes one or more virtual machines.

BACKGROUND

Various approaches to data protection have been devised which depend to some extent at least on the nature of the environment in which the data protection processes are to be implemented. For example, data protection processes and related considerations associated with a physical environment may be quite different from data protection processes and related considerations associated with a virtual environment. Moreover, the entity controlling data protection in a physical environment may not be the same entity that controls data protection in a virtual environment.

In more detail, running data protection storage as an appliance, whether in a cloud environment or simply as a virtual machine, can pose significant challenges, since the environment is not under full control of the appliance. As a result, detecting the root cause of problems, such as data corruption for example, can become difficult if not impossible. This is true at least in part because the source of such problems may not be readily ascertainable.

For example, in the example environment mentioned above, data corruption problems might stem from bugs in the code of the data protection appliance itself. However, data corruption problems may additionally, or alternatively, stem from various environmental factors and events. Some examples of such environmental factors and events can include cloud storage inconsistencies, caches between the virtual appliance and the physical storage, and an inability to detect transient errors on the backend storage of the cloud.

As well, virtualized environments can present particular difficulties in terms of the ability to detect, and identify the cause of, problems associated with data protection. In fact, there are some data integrity problems that can occur in a virtualized data protection environment that simply do not exist in physical data protection environments. At least some of such problems concern the detection and triaging of data corruption and data corruption events.

To illustrate, a physical data protection environment may include both hardware and software that is owned and controlled by a vendor. In this case, it may be relatively easy for the vendor to detect, and identify the source of, any data integrity problems in the physical data protection environment, since the vendor has a significant degree of control over the structure and operation of data protection operations in that environment.

On the other hand however, a virtualized data protection environment may be partly, or completely, controlled by the enterprise whose data is the subject of that data protection environment. In this case, a variety of different virtual elements may be defined and used that are based on hardware not controlled by the vendor. Such virtual elements might include, for example, storage, central processing unit (CPU), memory, network elements. As well, a hypervisor that creates and runs virtual machines in the virtualized data protection environment may also be controlled by the enterprise. Because of circumstances such as these, data corruption events that occur in the virtualized storage environment are difficult to detect and triage. While it is possible to examine, for example, hypervisor logs, storage logs, and switch logs, to identify the entity that caused the data corruption, such an approach would be very inefficient in practice, and may not be effective in any case.

Alternate data corruption detection methods may be devised as well. However, these other methods may be of only limited effectiveness, insofar as they can only identify whether or not data corruption has occurred, and do not identify the cause or source of the data corruption.

In light of the foregoing, it would be useful to provide mechanisms which are able to identify not only the fact that data corruption has occurred, but are also able to determine the source or cause of the data corruption, or at least eliminate certain entities or actors as being the source or cause of the data corruption. It would also be useful to implement such functionality in connection with a virtualized data protection environment.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
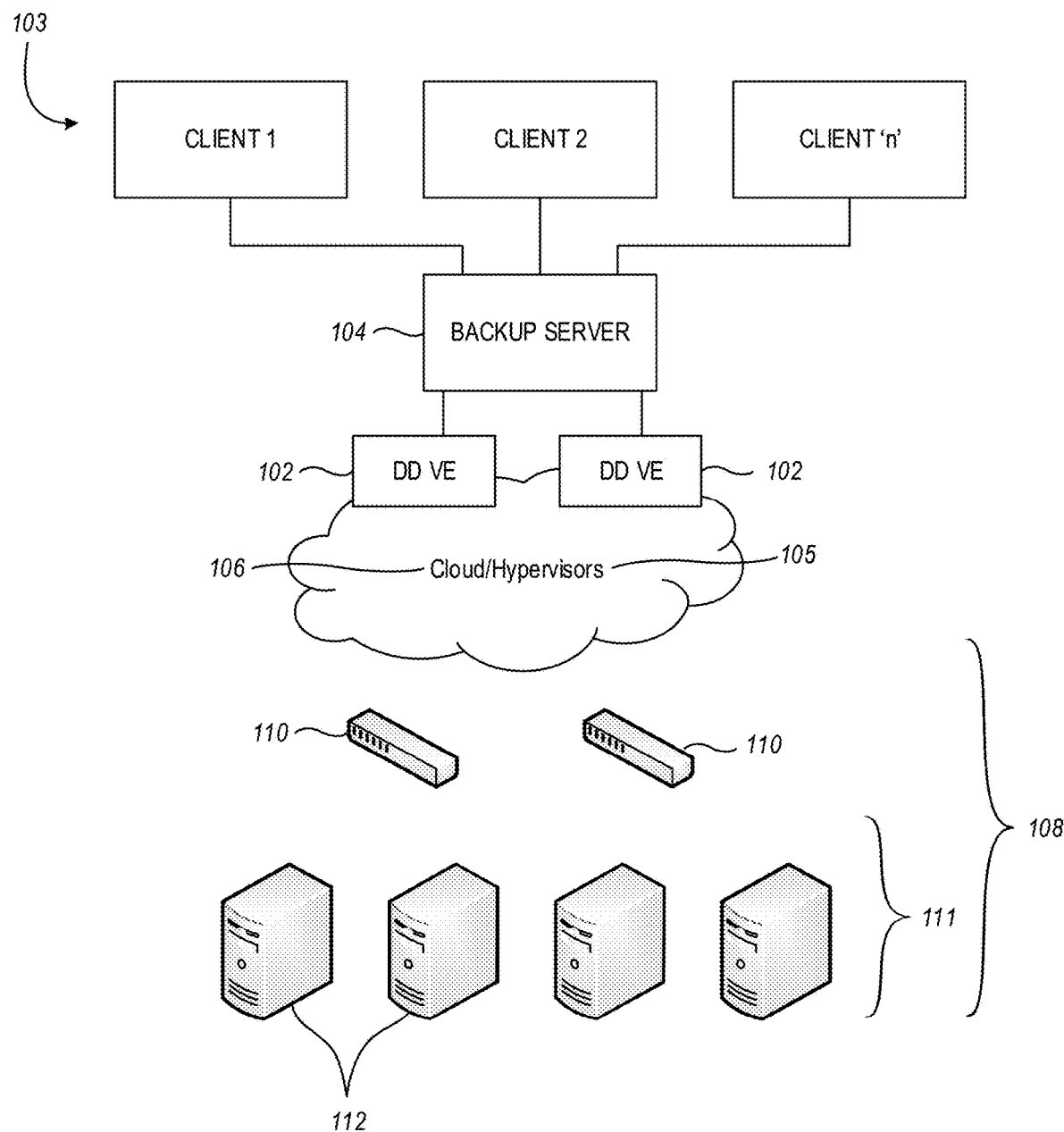
FIG. 1 discloses aspects of an example operating environment for at least some embodiments.

Embodiments of the present invention generally relate to detecting and triaging problems in a virtual computing environment. More particularly, at least some embodiments of the invention relate to systems, hardware, software, computer-readable media, and methods directed to detecting and triaging data integrity issues in a virtual computing environment that includes one or more virtual machines.

Example embodiments may reflect various approaches to the problems noted herein. For example, some embodiments are directed not to identifying a data corruption source or cause, but rather to eliminating certain entities or actors as being the source or cause of the data corruption. Based on this information, inferences can then be drawn about the identity of the likely source or cause of the data corruption. In other embodiments, the source or cause of the data corruption event is affirmatively identified. In still other embodiments, either or both of the aforementioned approaches can be taken, that is, the source or cause of the data corruption event is affirmatively identified, and/or one or more other entities are eliminated as possible sources or causes of the data corruption event.

In at least some embodiments, the aforementioned functionality can be achieved by way of inserting a layer in the IO stack of the virtual machine (VM) to track the data block accessing/updating record. As well, embodiments of the invention also embrace methods for auditing the accessing of one or more specified data blocks. As such, embodiments of the invention may perform any one or more of: detect illegal access to a certain data block; determine whether the data corruption is caused by a virtual machine itself or the virtual infrastructure; and identify the source or cause of the data corruption if the data corruption was caused by virtual machine itself.

Embodiments of the invention can be employed in connection with a variety of different storage scenarios, and are not limited for use with specific cloud storage or enterprise storage environments that are known and trusted. For example, embodiments can be used in cases where the storage is provided by untrusted vendor. Examples of such storage include network filesystem (NFS) exported storage, and internet Small Computer System Interface (iSCSI) exported storage. More generally, embodiments of the invention can be employed in any environment where data corruption due to unauthorized access, or other considerations, may be a concern.

As will be apparent from the present disclosure, embodiments of the invention may provide various advantages, although that is not required. For example, embodiments of the invention may enable protection of a VM from data corruption issues that would otherwise result from illegal access to the data. The illegal access to the data could be intentional, as in the case of a bad actor who wishes to harm the data of an enterprise, or the illegal access to the data could be inadvertent, such as in a case where a user with unauthorized access mistakenly deletes or overwrites data.

Another advantage that may be realized with at least some embodiments of the invention is that data corruption incidents can be triaged efficiently. For example, by evaluating an access record, such embodiments can determine, for example, an identity of the entity that accessed a particular data block, and the time that the data block was accessed. With this information, it becomes relatively simple to determine the source or cause of the data corruption problem.

As a final example, various embodiments may be advantageous insofar as they enable efficient use of human resources in detecting, identifying the cause of, and resolving, data corruption problems. In particular, at least some embodiments of the invention are able to determine whether or not a data corruption problem is caused by a particular VM. If the VM is not the cause of the data corruption problem, then the VM vendor does not have to allocate resources to resolving the problem, rather, the enterprise that is running the VM is responsible to address the problem.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in a data protection system operating environment that includes one or more storage systems or storage environments, various client systems and devices that generate data and perform, and/or request performance of, operations with respect to backed up data, such as search, read, and write operations. Such operations can be performed in connection with one or more data backup and/or data restore processes. Thus, processes such as are disclosed herein may be performed by a backup and/or restore application, which can be hosted on a server, that communicates directly or indirectly with one or more clients that generate and transmit read and write requests, although other applications could alternatively be employed. The backup and/or restore application may also communicate, directly or indirectly, with storage and/or storage servers in order to service client read and write requests directed to the storage and/or storage servers.

Example storage environments with which embodiments of the invention may be employed, may take the form of a cloud storage environment, an on-premises storage environment, and hybrid storage environments that include public and private elements, although the scope of the invention extends to any other type of storage environment as well. More generally, embodiments of the invention can be implemented in any suitable environment and the scope of the invention is not limited to the example environments disclosed herein. Any of these data protection environments can take the form of an operating environment that is partly, or completely, virtualized.

Correspondingly, any of the devices, including the clients, in the operating environment can take the form of software, physical machines, or virtual machines (VM), or any combination of these, though no particular client implementation is required for any embodiment. Similarly, data protection system components such as databases, data protection storage appliances, storage servers, storage disks, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

At least some embodiments of the invention can be employed in the Dell-EMC Data Domain (DD) Virtual Edition (VE) environment. This is not required however and, more generally, embodiments of the invention can be employed in any operating environment where one or more aspects of the functionality disclosed herein may be desired to be implemented.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

With particular reference now to FIG. 1, an example operating environment 100 may take the form of a data protection environment that includes one or more VMs 102. The VMs 102 can take the form of software-only data protection storage appliances and can service one or more data sources 103 that create and/or modify data that is desired to be protected. For example, applications associated with the data sources 103 may issue read and write requests to the VMs 102. Thus, the VMs 102 can be paired with backup software to facilitate backup and restoration of client data, such as by way of a backup server 104. The VMs 102 may process client data and/or client metadata prior to backup of the data and/or metadata. For example, the VMs 102 can deduplicate client data before transmitting the client data to a storage environment, such as a cloud storage environment for example.

While a VM 102 may be associated with one or more clients 103 of an enterprise, for example, the VM 102 need not be located on site at the enterprise, although it could be in some embodiments. As indicated in FIG. 1, the VMs 102 may run on top of one or more hypervisors 105 on site at an enterprise, or may run in a cloud storage environment 106. The cloud storage environment 106 may be accessible by the VMs 102, and data can be backed up to, and/or restored from, the cloud storage environment 106 by the VMs 102 operating in conjunction with a backup server (not shown).

As noted above, the VMs 102 can operate in connection with one or more data sources 103, such as clients for example, to facilitate protection of client data. The client data can be stored in a third party storage environment, which can take the form of a cloud storage environment, a physical storage environment which may be located on site at an enterprise, or a hybrid storage environment that uses both on site and off site resources. In the example of FIG. 1, a third party storage environment 108 can include, for example, switches 110 and a storage array 111 that includes one or more storage servers 112. However, the VMs 102 are not required to operate in connection with any particular type of storage environment and, as such, the arrangement indicated in FIG. 1 is provided only by way of example.

In an environment such as that disclosed in FIG. 1, embodiments of the invention are useful in determining, at least, whether or not a data corruption problem is caused by the VM 102, or caused by another entity. As well, such embodiments may also determine, if the data corruption problem was caused by the VM 102, which process(es), or thread(s), of the VM 102 caused the data corruption problem, and how the data corruption process was caused.

B. Example Host Configuration

Figure 2:
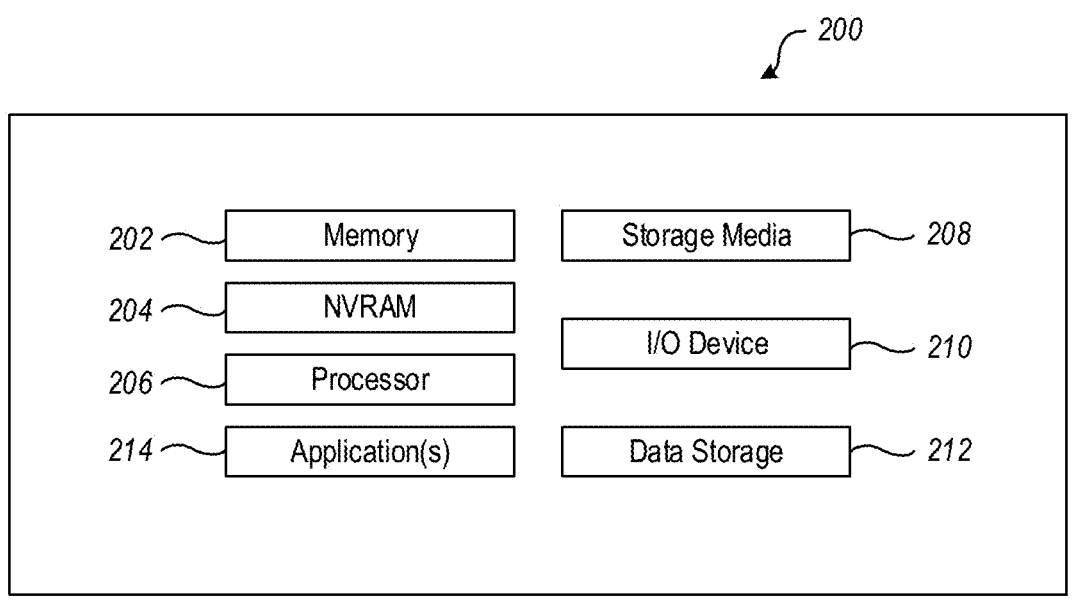
FIG. 2 discloses aspects of an example physical computing device configuration.

With reference briefly to FIG. 2, one or more of the data sources 103, backup server 104, hypervisor 105, storage server 112, and part or all of an access layer (see FIG. 4), can take the form of a physical computing device, one example of which is denoted at 200. As well, a virtual machine such as the VM 102 may constitute a virtualization of any combination of the physical components disclosed in FIG. 2. In the example of FIG. 2, the physical computing device 200 includes a memory 202 which can include one, some, or all, of random access memory (RAM), non-volatile random access memory (NVRAM) 204, read-only memory (ROM), and persistent memory, one or more hardware processors 206, non-transitory storage media 208, I/O device 210, and data storage 212. One or more of the memory components of the physical computing device can take the form of solid state device (SSD) storage. As well, one or more applications 214 are provided that comprise executable instructions. Such executable instructions can take various forms including, for example, an access control check module, an access policy engine, an access recording module, and an access record store, or any combination of these. Further details concerning these example applications are disclosed elsewhere herein, including in the discussion of FIG. 4.

C. Example IO Stack and Access Layer in VM

Figure 3:
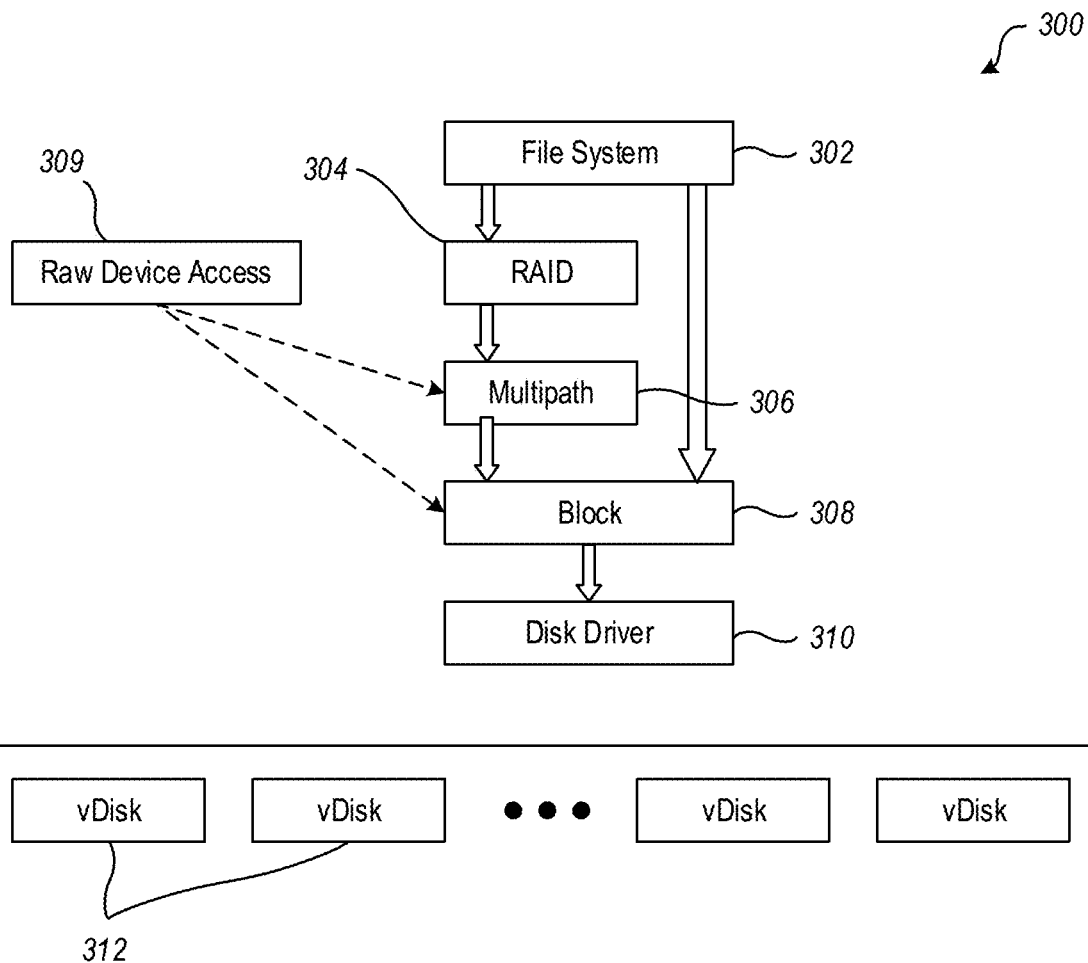
FIG. 3 discloses aspects of an example IO stack in a virtualized data protection environment.
Figure 4:
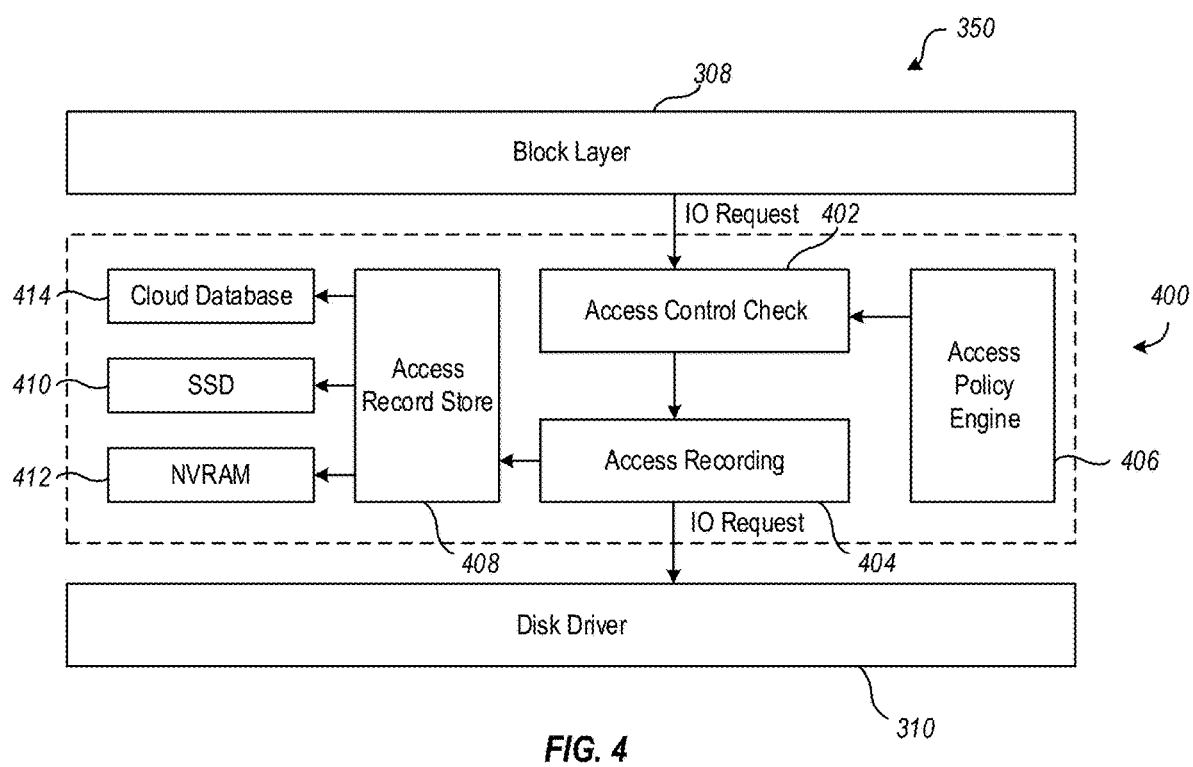
FIG. 4 discloses aspects of an example control layer for a data path.

With reference now to FIGS. 3 and 4, details are provided concerning an example VM input/output (IO) stack 300 that includes an access layer. In general, FIG. 3 discloses an IO stack 300 that does not include an access layer, and FIG. 4 discloses a partial IO stack 350 that includes an access layer 400.

Directing particular attention first to FIG. 3, the example IO stack 300 of the VM may include a file system 302, a redundant array of independent disks (RAID) 304, a multipath device 306 which may be BIO-based or request-based. If the multipath device 306 is request-based, then it may be positioned above the block layer 308. Among other things, the multipath device 306 can provide a raw device access interface 309 to the block layer 308. Finally, the IO stack 300 can include a disk driver 310 that interfaces with one or more virtual disks 312 for data protection operations. As configured in FIG. 3, the IO stack 300 may be vulnerable to data corruption that may not be detectable and/or may not be attributable to a particular source. As well, the configuration of the IO stack 300 may be such that it cannot be confirmed with certainty that the VM itself is not the source of the data corruption.

In more detail, and as indicated in FIG. 3, there are any number of ways for entities, such as clients or other data sources, to issue IO commands to the block layer 308, namely, the file system 302, RAID 304, and the raw device access interface 309. In some instances, the file system 302 and RAID 304 are configured to ensure data safety. However, the raw device access interface 309 typically lacks a good mechanism to avoid data corruption. As such, use of the raw device access interface 309 to gain direct access to the block layer 308 can result in data corruption problems that are beyond the control of the VM to prevent. Thus, while the IO stack 300 includes some safeguards, it is in some respects still vulnerable to data corruption.

It should be noted that the term 'raw device' may be associated with Unix operating systems, but the scope of the invention is not limited to such operating systems. More generally, the notation 'raw device' herein refers to any logical device that can bypass one or more elements of the IO stack and directly access the block layer 308 and/or access the block layer 308 by way of the multipath device 306.

Turning now to FIG. 4, details are provided concerning the partial IO stack 350 that includes an access layer 400. In general, the access layer 400 can implement, or at least enable, various useful functions that can be used to make various assessments concerning data corruption events. While, in some embodiments, the access layer 400 does not control which entity, or entities, can access the storage devices, such as virtual disks 312 in the case of a VM, use of the access layer 400 does enable, for example, identification of entities that access the storage device, the address and length of the request/access time, the IO type (for example, READ or WRITE), and the specific data that is being written in the case of a WRITE request. With this access history information, a determination can be made, for example, as to whether a data corruption event is caused by the VM, and which thread(s) of the VM caused the data corruption.

While the access history can thus be quite useful, there are practical limits to how much of the access history can be stored. However, embodiments of the invention provide a mechanism for storing the amount of access history information that is needed to make determinations such as those noted above and disclosed elsewhere herein. In particular, one way to manage the access history information is to keep only relatively recent access records. For example, the most recent one or two access records for each block may be retained. The size of the block may be predefined and, in some embodiments at least, the block size may be the same as a RAID stripe unit size, although that is not required and other block sizes and block sizing methodologies could be used. The size of the access record relating to the block can depend, for example, on how much information is to be included in the record. To illustrate, if 1 Mb is chosen as the block size, and 16 bytes allocated for 1 access record for that block, a 1 Tb disk would have to have 16 Mb of its storage space allocated for the storage of access records.

In addition to determining the amount of access history to be stored, it is also useful to determine where the designated access history should be stored. In at least some embodiments, the access history information is located relatively near to the storage device. This approach helps to ensure that all the IOs issued to each storage device can be captured.

With particular reference now to FIG. 4, and with the foregoing considerations in view, embodiments of the invention include an access layer 400 between the block layer 308 and the disk driver 310 of the VM IO stack 350. In general, the access layer 400 can be implemented in a variety of different virtual machines and, accordingly, the VM IO stack 350 disclosed in FIG. 4 is presented only by way of example. Among other things, the location of the access layer 400 in the VM IO stack 350 enables checking of an access request before the request is issued to the underlying layer, the disk driver 310 in this example. By checking the access request at this point in the IO process flow, attempted illegal accesses can be detected before access is actually granted. This approach is also well suited to the circumstance where different disk regions belong to different respective owners. In this circumstance, each different owner can be notified in the event of an attempted unauthorized access to its region of the disk.

As shown, the access layer 400, which can be implemented as a module, includes an access control check module 402 that controls IO access. For example, when a new IO request arrives, a check is performed to determine if there is any existing access policy that applies to the IO request. In at least some embodiments, the access policies are implemented on a per device basis, so when the IO request is received, a check is performed to determine which device(s), if any, the IO request corresponds to. If an access policy is determined to exist that applies to the IO request, then the IO request can be checked to determine if it is consistent with the access policy or not, that is, whether or not the operation specified in the IO request is permitted by the access policy.

If the operation specified in the IO request is permitted by the policy, the IO request can be passed along to the access recording module 404, as discussed below. On the other hand, if the operation specified in the IO request is not permitted by the policy, various actions can be taken by and/or at the direction of the access control check module 402. For example, if the IO request is an illegal READ request, a warning message could be printed. As another example, if the IO request is an illegal WRITE request, the IO request may be refused by the access control check module 402. Additionally, or alternatively, in the case of an illegal WRITE request, the access control check module 402 could issue a system panic indicating a serious, or fatal, error.

Depending upon the nature of the operating system where the VM is used, the approach to handling IO requests can vary. For example, where the operating system is Linux, each block IO request may include multiple discrete IO requests, each of which may be introduced by different application. In this case, the access control check module 402 may iteratively, or otherwise, scan through the block IO request to evaluate each of the discrete IO requests individually, in order to determine if each of the discrete IO requests is legal or not.

With continued attention to FIG. 4, the access layer 400 also includes an access policy engine 406. As noted earlier, the access control check module 402 needs to know, for any IO request, what to check and what action to take. This information is provided by the access policy engine 406. In brief, the access policy engine 406 may perform functions including, but not limited to, defining access rules, defining action(s) corresponding to any violations, and defining how policies are to be updated.

The access rules define which entities can access which portion(s) of a disk, or disks. In a Linux system, for example, the IO requests may be generated by each process, and each process can only access certain range of disk space, such as a logical block addressing (LBA) range, or a particular partition of the disk. The requested access could be READ or WRITE. Information such as this can be used to define an access rule. For example, the process name and partition number, or LBA range, and permitted IO processes can be used to form a rule thus—[process_A, Read Write, sda1]. In general, the access rule may be applied when the IO request is received by the access control check module 402. However, depending upon the operating system involved, a modified approach may be used. For example, in Linux, if an IO request goes through a page cache, then it may be difficult, or impossible, to determine which entity initiated the IO request. Thus, the way in which IO requests are handled may differ from one IO request to another IO request. In the aforementioned Linux example, the access rule can be applied to the IO request before the IO request is added to the page cache. It should be noted here that reference to the Linux operating system is only for the purposes of illustration, and the scope of the invention is not limited to the Linux operating system, or any other operating system.

The access policy engine 406 also defines action(s) corresponding to any violations. In general, the action(s) corresponding to the violation can be based on considerations such as, but not limited to, the relative importance of the data and/or the potential consequences of the violation, if it were to occur. To illustrate, a READ violation typically would not cause data corruption, so the action could be simply a log message or an alert. On the other hand, a WRITE violation could result in data corruption or data loss. In this case, the IO operation specified in the IO request may be terminated immediately by the access control check module 402, and an alert issued by the access control check module 402 indicating that an unauthorized WRITE operation is being, or has been, attempted.

As well, the access policy engine 406 can also define how access policies are to be updated. In general, the policies can be static or dynamic. A static policy is one which, once defined, and refined if necessary, cannot be modified. On the other hand, a dynamic policy can be freely updated. Dynamic policies are especially desirable in some circumstances, due to their inherent flexibility.

In at least some embodiments, a policy comprises, or consists of, two parts or two copies. One copy of the policy resides in memory, while the other copy resides on disk. The policy copy in memory can be loaded from the disk copy of the policy when the system boots up. When there is a need to update a policy, such as a dynamic policy, either the on disk copy can be updated and the access policy engine 406 notified to update the in memory copy, or the in memory copy can be updated first and then flushed to the disk. Updating the disk copy may be a relatively simple matter that involves opening and editing the configuration file. On the other hand, updating the in memory copy may involve the use of a special interface. For example, in Linux, the sys interface/ioctl/proc interface could be used to update the in memory copy of the policy.

As further indicated in FIG. 4, the access layer 400 may include an access recording module 404. In general, the access recording module 404 is responsible for recording access records which, as noted elsewhere herein, can be used to determined, for example, whether a data corruption event is caused by the VM, and which thread(s) of the VM caused the data corruption. Such access records can also be used to confirm that the VM was not the cause of the data corruption event.

As disclosed herein, it is useful to store a variety of information. Examples of such information include when access to a certain area of a disk was requested, the identity of the entity that made the request, checksum information concerning the data blocks that were accessed, and an update counter. The use of checksums is discussed in more detail below but, in general, checksums or similar mechanisms can be used to verify whether data was written by the VM, or another entity.

Because the space for storing access records may be limited, as discussed above, some embodiments of the invention provide for storing access information only for IO requests that involve WRITE operations. In this way, more efficient use can be made of the limited storage space since READ operations typically do not cause data corruption events.

It is particularly helpful to store the checksum since that information is used to determine whether the data is corrupted by a VM process, or by a third party such as the enterprise or a vendor. In particular, when a new IO request is received by the VM specifying a WRITE operation, the checksum of the IO is calculated, and the corresponding recording block is updated by the access recording module 404. In the particular example of the Dell-EMC Data Domain environment, the RAID layer 304 checksum may be used since the block size is the same as stripe unit size. This approach eliminates the need to perform an additional calculation of the checksum by the access recording module 404.

With continuing attention now to FIG. 4, the access layer 400 may also include an access record store 408. In general, the information desired to be preserved for each IO request will determine the size of each access record. Further, the block size chosen and the overall disk size will determine the total space needed for the record. To illustrate, if it is assumed for each 1 TB of storage, 16 MB space are needed for the access records, then in a relatively small system, such as <10 TB, the records can be retained in the memory.

Because the access record is important to determining the source or cause of data corruption events, it may be flushed to disk frequently. In at least some embodiments, a dedicated partition or disk is used to store the access records. As well, in some embodiments, a high speed non-volatile media such as SSD 410 or NVRAM 412 can be used to cache the record. In particular, the access record can first be written to the high speed non-volatile media, and then flushed to disk. In a cloud environment where there is no SSD/NVRAM, the object storage or the cloud vendor data base service 414 can be used for caching the access records.

D. Aspects of Some Example Methods

Figure 5:
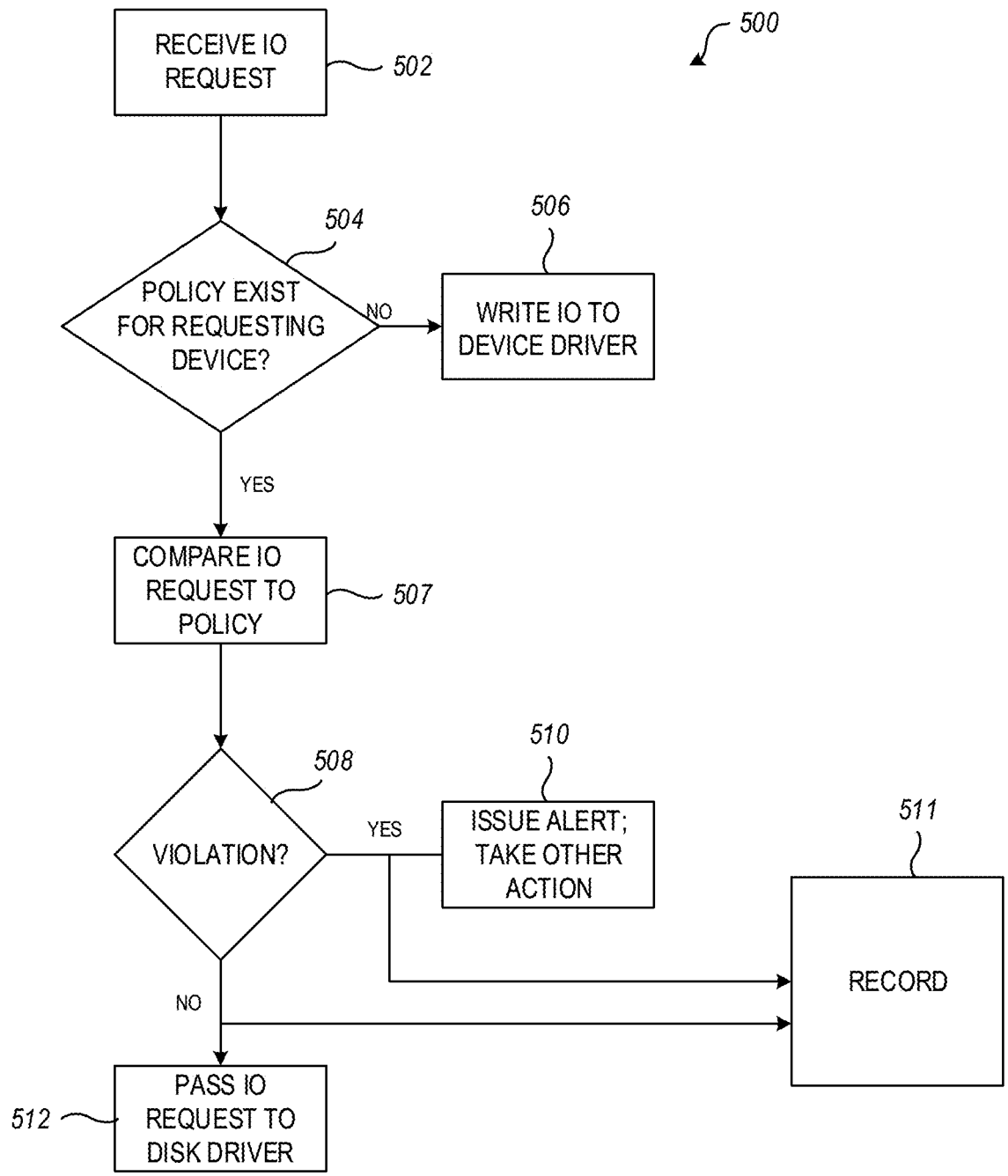
FIG. 5 discloses aspects of an example process for handling an IO request.

With reference now to FIG. 5, methods for handling an IO request are disclosed, where one particular embodiment of a method is denoted generally at 500. In some embodiments at least, the method 500 can be performed in whole or in part by a VM, and particularly by an access layer of a VM.

The method 500 can begin when an IO request is received 502 at a VM, examples of which are disclosed herein. The IO request can be received 502 from an internal VM process, or from an entity other than the VM. An initial check 504 can be performed to determine if a policy exists for the device or other entity that originated the IO request. Even if there is no policy, and the IO request specified a WRITE operation, the IO request will be written 506 to the device driver.

If a determination is made 504 that a policy exists for the device or other entity that originated the IO request, the IO request is then evaluated 507 in light of that policy. If the IO request is determined 508 to be consistent with the policy, the operation(s) specified in the IO request can be passed to a disk driver 512. On the other hand, in the event that the IO request is determined 508 to be in violation of the policy, various actions can be taken 510.

For example, an alert can be issued, or a system panic notice generated. Because the VM that receives the IO request may not, in at least some embodiments, be able to control access to the disk, the IO request may be passed to the disk driver, even if that IO request is determined to be in violation of the policy. That is, all IO requests received by the VM may be passed to the disk driver, regardless of whether or not the IO requests violate applicable policies. In some embodiments at least, the VM may prevent IO requests from being sent to the disk driver if the IO requests are generated as part of an internal VM process.

Even though the VM that receives the IO request may not, in at least some embodiments, be able to control access to the disk, the IO request that specified the unauthorized operation can nonetheless be recorded. In particular, whether or not the IO request is determined 508 to present a violation, the IO request can be recorded 511, such as by an access recording module for example, in an access record store. In at least some embodiments, only WRITE accesses are recorded 511. In some embodiments, the IO request can be recorded 511 after a determination is made 504 as to whether or not a policy exists for the requesting device or entity. In particular, the IO request can be recorded 511 if a policy is determined 504 to exist, and/or if it is determined 504 that no policy exists.

Figure 6:
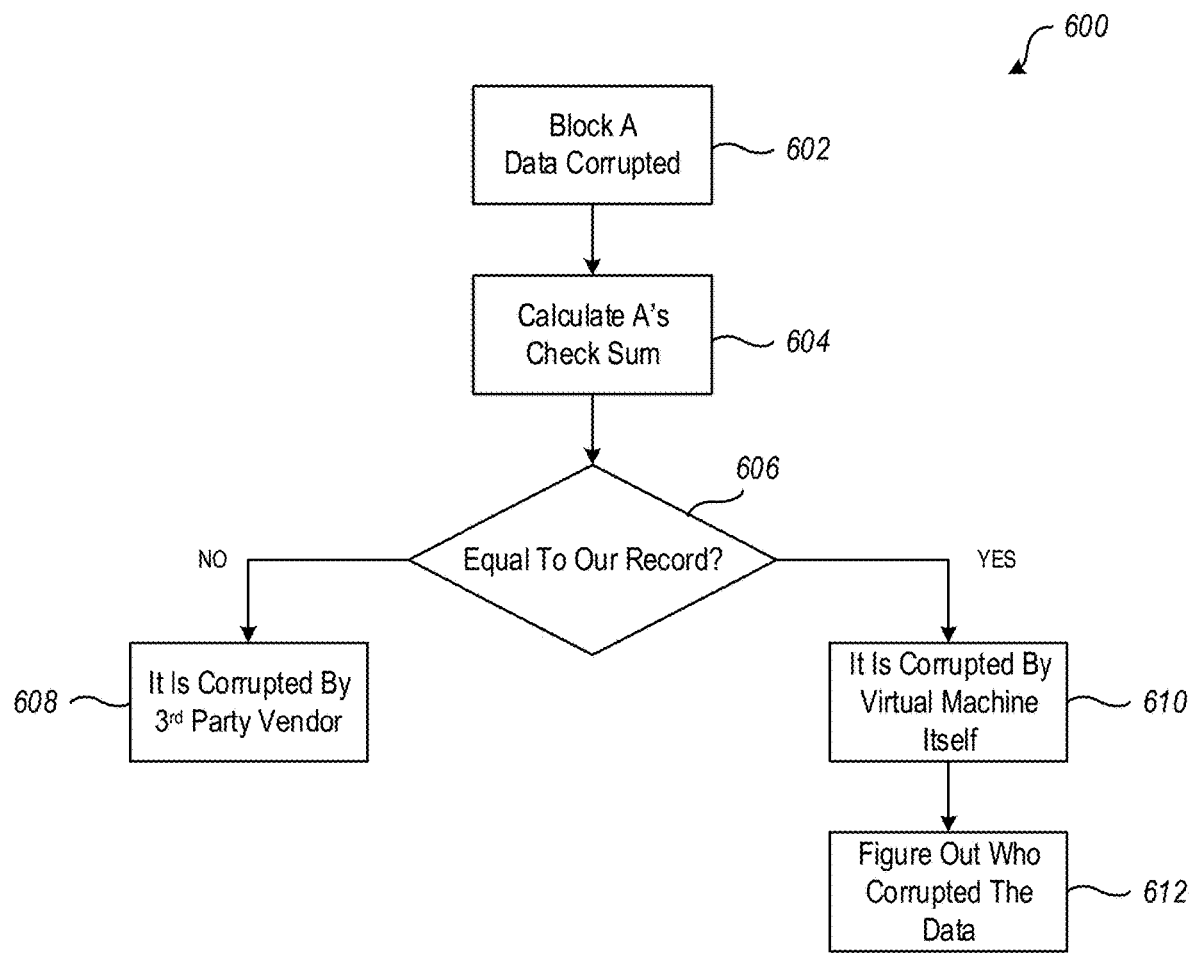
FIG. 6 discloses aspects of an example process for identifying a source or cause of a data corruption event.

With reference now to FIG. 6, methods for determining a source or cause of a data corruption event are disclosed, where one particular embodiment of a method is denoted generally at 600. Initially, a determination may be made 602 that a data block is corrupted. A checksum for the corrupted data block is then calculated 604 by the VM. It should be noted that the use of a checksum is provided by way of example and, more generally, any other method for comparing a corrupted data block with a record relating to that data block could be used.

After the checksum is calculated for the corrupted data block, an access record for that data block can be examined to determine the value of the checksum contained in the access record. A comparison 606 can then be performed to determine if the checksum in the access record matches the calculated 604 checksum. If the checksum in the access record does not match the calculated checksum, then it can be concluded 608 that the data block was corrupted by an entity other than the VM. On the other hand, if the checksum in the access record matches the calculated 604 checksum, then it can be concluded 610 that the data block was corrupted by the VM. In the latter case, the method 600 can continue and a determination made 612 as to which process or thread of the VM was the cause of the data corruption.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A system, comprising:
    one or more hardware processors; and
    a non-transitory storage medium having stored therein instructions which are executable by the one or more hardware processors to perform operations comprising:
    receiving an Input/Output (IO) request that specifies an operation to be performed on a data block;
    determining if a policy exists for a device that made the IO request;
    when a policy is determined to exist for the device, comparing the IO request to the policy; recording the IO request by creating a record of the IO request; and
    passing the IO request to a disk driver regardless of whether the IO request is determined to violate the policy or not.

2. The system as recited in claim 1, wherein the operations are performed in whole or in part by an access layer in an IO stack of a virtual machine.

3. The system as recited in claim 2, wherein the access layer is positioned between a block layer of the IO stack and a disk driver layer of the IO stack.

4. The system as recited in claim 1, wherein the IO request is received from a block layer.

5. The system as recited in claim 1, wherein the IO request is received from a raw device.

6. The system as recited in claim 1, wherein when a policy is determined not to exist for the device, the operation specified in the IO request is denied if the operation is a WRITE request.

7. The system as recited in claim 1, wherein when comparison of the IO request to the policy indicates a violation of the policy, an action is taken concerning the violation.

8. The system as recited in claim 1, wherein the record of the IO request comprises a combination of any one or more of: a checksum of the data block with which the IO request is concerned; identification of an entity that made the IO request; the operation(s) specified in the IO request; identity of the data block; a time of the IO request; and, address and length of the IO request.

9. The system as recited in claim 1, wherein the IO request is only recorded when the IO request specifies a WRITE operation.

10. The system as recited in claim 1, wherein the disk driver is associated with a virtual storage disk.

11. The system as recited in claim 1, wherein the operations further comprise calculating a checksum of the data block with which the IO request is concerned, wherein calculation of the checksum is performed after receipt of the IO request.

12. The system as recited in claim 1, wherein the operations further comprise updating an access record associated with the data block identified by the IO request.

\* \* \* \* \*